(No Model.)
V. D. VAN FLEET.
CHECK ROW ATTACHMENT FOR SEED PLANTERS.
No. 306,445. Patented Oct. 14, 1884.
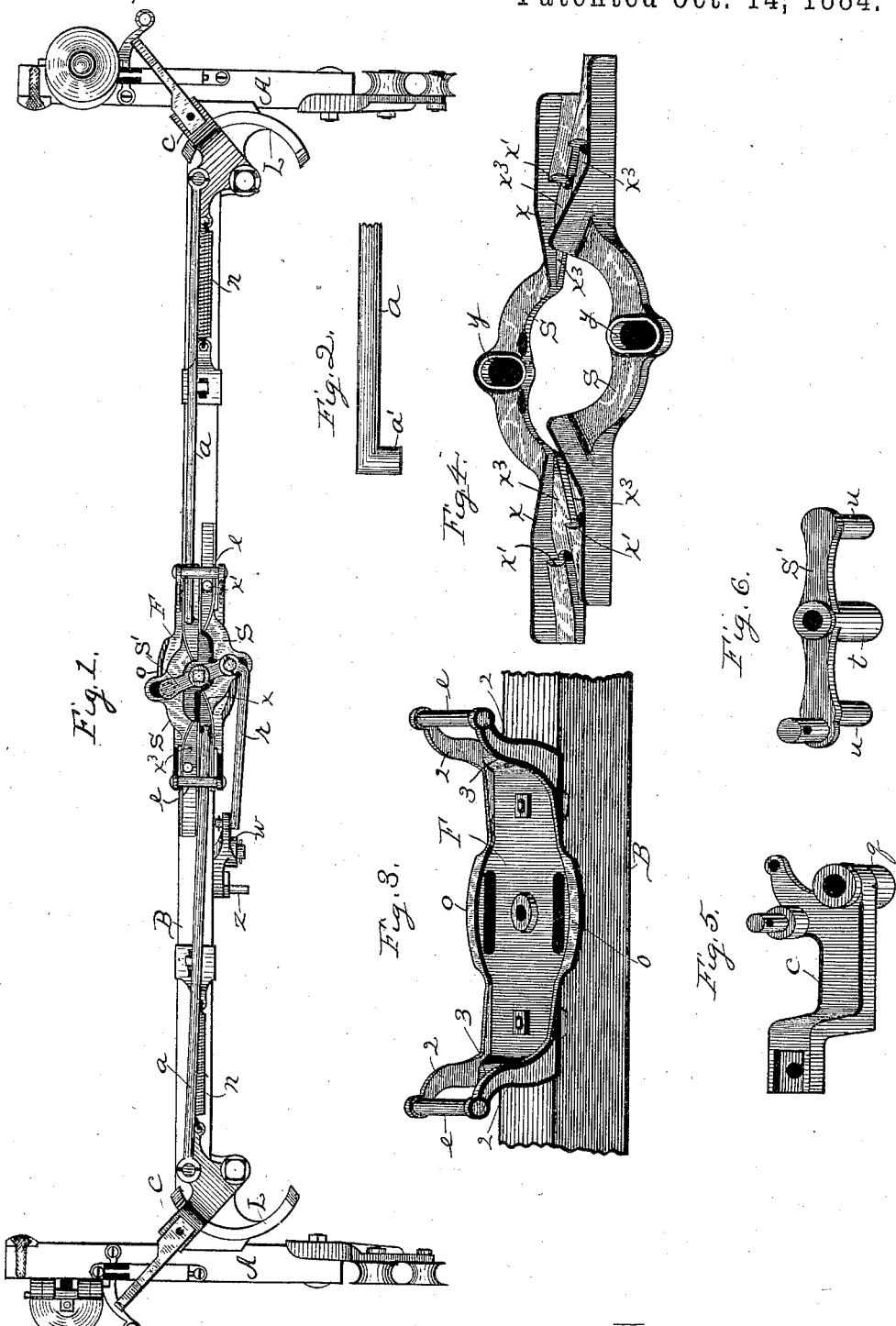
Witnesses.
Thos. H. Hutchins.
Wm. J. Hutchins.
Inventor—
Victor D. Van Fleet.

UNITED STATES PATENT OFFICE.

VICTOR D. VAN FLEET, OF JOLIET, ILLINOIS, ASSIGNOR TO ANDREW H. SHREFFLER, OF SAME PLACE.

CHECK-ROW ATTACHMENT FOR SEED-PLANTERS.

SPECIFICATION forming part of Letters Patent No. 306,445, dated October 14, 1884.

Application filed June 30, 1884. (No model.)

*To all whom it may concern:*

Be it known that I, VICTOR D. VAN FLEET, a citizen of the United States of America, residing at Joliet, in the county of Will and State of Illinois, have invented certain new and useful Improvements in Check-Row Attachments for Seed-Planters, of which the following is a specification, reference being had therein to the accompanying drawings.

Figure 1 is a plan view on the top, showing the entire machine, and having the improvements applied; Fig. 2, a plan view on the side of a section of one of the connecting-rods, showing its hooked end that operates the slides; Fig. 3, a perspective view of the bed plate and frame on which the slides operate; Fig. 4, a side perspective view of the reciprocating slides; Fig. 5, a perspective view of one of the bell-cranks, and Fig. 6 a perspective view of the double crank which is operated by the slides.

Referring to the drawings, Fig. 1 represents the entire machine as it appears ready to be attached to any ordinary seed-planter by means not necessary to be shown. It consists of the beam B, having at each end a crosshead, A, provided with the ordinary sheavewheels for holding a knotted check-row wire that actuates the forked levers C as the machine advances.

At the center of the beam B is a plate, F. (Shown in perspective in Fig. 3, to show its precise form.) This plate is firmly secured to the beam B, and is formed with elevated sides 2, for holding in the two slides S S. (Shown in perspective in Fig. 4.) The cross-bars $e$ $e$ connect the two sides of said plate and prevent the connecting-rods $a$ from bounding upward off of the slides S. These slides S are constructed in the form shown in Fig. 4, being provided with the inclines $x^3$ $x^3$, converging flanged sides $x$ $x$, vertical offsets $x'$ $x'$, and slots $y$ $y$, and are applied to the plate F, as shown in Fig. 1. The connecting-rods $a$ $a$ connect said slides with the bell-crank $c$, to which the forked levers attach, and are by means of such connection reciprocated, as hereinafter stated. The two slides S S are connected at the center by means of the double crank S'. (Shown in perspective in Fig. 6.) This crank is attached to the beam B by means of a stud-bolt passing through its central hub, $t$, through the center of the plate F into the beam B, and oscillates on said stud-bolt. Each end of said double crank S' is provided with a depending lug, $w$ $w$, which respectively operate in the slots $y$ $y$ of said slides, and thus connect them together. Said double crank is connected to the drop-lever W by means of connecting-rod $r$, as shown in Fig. 1. The seed-slide of the planter is intended to connect with said drop-lever W by means of its drop-pin $z$. When one of the slides S is moved, said double crank will, by means of its connection with the other slide, reciprocate or move it in the opposite direction. The ends of the connecting-rods $a$ that rest on said slides S S terminate in the hook $a'$, as shown in Fig. 2.

The double crank S' is operated to impart motion to the seed-slide of a planter, which is connected therewith by the rod $r$ and drop-lever W by means of the slides S S, which reciprocate simultaneously in opposite directions. These slides are caused to operate thus by means of the rod $a$, lever $c$, and coil-spring $n$ in the following manner: Only one end of the machine is operated at a time by the knotted wire, the other remaining at rest.

When the machine is traveling from one knot to another on the check-row wire, the rod $a$ and bell-crank $c$ are quiet, and the hook $a'$ rests hooked over behind the vertical offset $x'$ next nearest the double crank S'; but as the forked lever on bell-crank $c$ is arrested by and engages with a knot it is caused to turn backward and pulls on the rod $a$, causing hook $a'$ to move the slide into which it is hooked, thus partially rotating double crank S' and shifting or changing the position of the two slides so the vertical offset in the opposite slide will be next nearest the crank S'. When the forked lever is released from the knot, the coil-spring $n$ returns it, and with it the rod $a$ and hook $a'$, and as the hook $a'$ rides up the incline $x^3$ in returning it is forced off from said incline onto the opposite slide and behind its vertical offset $x'$ by means of the converging sides $x$, ready for another like operation with the other slide, and so on it alternately changes from one slide to the other, and thus reciprocates them simultaneously in opposite directions for the purpose stated. The straight ends of the slides rest on the elevated portions 3 3 of the plate F, and the curved central portion of said slides rests on the elevated parts $o\ o$ of said plate, for the purpose of lessening friction and preventing the slides from rolling outward out of place. The forked lever of the bell-crank $c$ rests on the segment L, having turned-up ends to prevent the lever from vibrating too far in either direction.

The principal new features consist in the use of the slides S and double crank S' and their immediate operating parts.

Having thus described my invention, what I claim as new, and desire to secure by Letters Patent, is as follows, to wit:

1. In the check-rower described, the slides S S, having the converging side flanges, $x\ x$, vertical offsets $x'\ x'$, and inclines $x^3\ x^3$, arranged to simultaneously reciprocate in opposite directions on the plate F, within the sides 2, by means of the hooked rods $a$, as described, to oscillate the double crank S' to actuate the seed-dropping mechanism, substantially as set forth.

2. In the check-rower described, the bed-plate F, having the end elevations, 3, sides 2, cross-bars $e$, and elevated portions $o\ o$, as shown, and adapted to support the slides S S, so they may be reciprocated on said plate, as and for the purpose set forth.

3. In a check-rower for seed-planters, the combination of the slides S S, each having the converging side flanges, $x\ x$, vertical offsets $x'\ x'$, inclines $x^3\ x^3$, and slots $y\ y$, double crank S', having the depending lugs $w\ w$ to operate in said slots, bed-plate F, and hooked connecting-rods $a$, as and for the purpose set forth.

VICTOR D. VAN FLEET.

Witnesses:
A. VAN FLEET,
WM. J. HUTCHINS.